| United States Patent [19] | [11] 4,020,227 |
|---|---|
| Deffeyes | [45] Apr. 26, 1976 |

[54] MAGNETIC TAPE

[75] Inventor: Robert J. Deffeyes, Graham, Tex.

[73] Assignee: Graham Magnetics Incorporated, Graham, Tex.

[22] Filed: June 16, 1976

[21] Appl. No.: 696,556

Related U.S. Application Data

[63] Continuation of Ser. No. 153,882, June 16, 1971, abandoned.

[52] U.S. Cl. .............................. 428/306; 428/309; 428/329; 428/425; 428/900

[51] Int. Cl.$^2$ ........................................ H01F 10/02

[58] Field of Search ...................... 427/127–132, 427/47, 48; 428/900, 538, 539, 329, 306, 309, 425

[56] References Cited

UNITED STATES PATENTS

| 3,149,995 | 9/1964 | Bauer | 117/235 |
|---|---|---|---|
| 3,320,090 | 5/1967 | Graubart | 117/145 X |
| 3,411,944 | 11/1968 | Higashi | 117/138.8 X |
| 3,547,693 | 12/1970 | Huguenard | 117/235 |
| 3,558,353 | 1/1971 | Harada et al. | 117/235 |
| 3,574,684 | 4/1971 | Higashi | 117/235 X |
| 3,586,630 | 6/1971 | Ingersoll | 117/235 |
| 3,597,273 | 8/1971 | Akashi et al. | 117/235 |
| 3,617,378 | 11/1971 | Beck | 117/235 |
| 3,630,771 | 12/1971 | Akashi et al. | 117/235 |
| 3,630,772 | 12/1971 | Seidel | 117/235 |
| 3,630,910 | 12/1971 | Akashi et al. | 117/235 |
| 3,649,541 | 3/1972 | Ingersoll | 117/235 |
| 3,650,828 | 3/1972 | Higashi | 117/235 |
| 3,761,311 | 9/1973 | Perrington | 117/239 |

*Primary Examiner*—Bernard D. Pianalto
*Attorney, Agent, or Firm*—Robert A. Cesari; John F. McKenna; Andrew F. Kehoe

[57] ABSTRACT

Magnetic tape having extraordinary performance characteristics and formed with a sparingly-crosslinked, polyurethane-based polymer binder system as a matrix for magnetic particles. The binder system is characterized by toughness of at least 150 in-lbs. per in$^3$, and the ability to withstand video tape-Test for over an hour before any substantial tape degradation occurs. Magnetic coatings prepared according to the invention comprise a binder system of at least 50% of a tough polyurethane.

19 Claims, No Drawings

MAGNETIC TAPE

This is a continuation of application Ser. No. 153,882 filed June 16, 1971 and now abandoned.

BACKGROUND OF THE INVENTION

In reading the subsequent discussion of prior art, it is to be kept in mind that the art discussed is a collection made by the inventors with the advantage of hindsight afforded by their knowledge of their own invention.

A great deal of inventive effort has been expended during the last decade in providing suitable magnetic tapes for use as information storing media. Such tape media find use in audio systems, instrumentation systems, computer systems and video systems. They usually comprise a passive backing sheet and an active, i.e. magnetic, coating on the backing sheet.

During use, these tapes are subjected to large mechanical stresses caused by quick-accelerating winding devices, abrasion from static parts associated with reading apparatus, cleaner blades, contact with guides, etc. These stresses most commonly cause an eventual wear of the magnetic coating which may manifests itself by spurious errors appearing in the information stored on the tape. Such errors can be dropout (the loss of information) or dropin (the spurious addition of information).

One of the most fruitful areas for improving magnetic tape performance has been formulation of improved binder systems for carrying electromagnetic particles which form the information-carrying component of the tapes. The binder must adhere to a backing film, for example poly(ethylene terephthalate)-type substrates, and provide an abrasion-resistant, oil resistant material of good physical properties.

Poly(vinylchloride) was one of the first polymers to be used in forming binders for use in tapes, but that material lacked a number of desirable physical properties and also tended to degrade in the presence of the iron oxide particles embedded within the polymer matrix. More recently tape-development work has been done using a large number of polymers. One of the generic types of polymers which was utilized was the polyurethane type. These polyurethane materials were recognized as contributing desirable chemical resistance (as to cleaning solvents) to the tape systems an also imparting desirable physical properties, such as abrasion resistance, to the tape.

Thus, in U.S. Pat. No. 3,149,995 to Baur, diisocyanate-based elastomer and a vinyl copolymer were described as being mixed together to form a binder system for electromagnetic particles. Similarly, in U.S. Pat. No. 3,216,846 to Henricx et al, certain types of "hindered" poly(isocyanates) were reacted with hydroxylbearing reactants to form improved binder-system components. Hendricx used a major quantity of vinyl resin in the binder system, presumably to provide flexibility.

Talley, in U.S. Pat. No. 3,144,352, also discloses the use of a polyurethane-bearing binder. His urethane-type resin is combined with a copolymer of vinylidene chloride and acrylonitrile to give a resultant binder that — although having certain advantages — is highly brittle. Moreover, the vinylidene chloride must be carefully stabilized against catalytic degradation caused by the iron oxide particles held within the binder.

Further attempts to incorporate the advantageous properties of polyurethane materials in tape systems are described in U.S. Pat. No. 3,320,090 to Graubert wherein a polyurethane system combines a reaction product formed of a diisocyanate, a diabasic acid and a polyol with a phenoxy resin. The resulting material, although incorporating up to 75% of urethane polymer therein, is more brittle than it has now been discovered is desired for many services.

Another disclosure of the use of polyurethane-type systems in magnetic tape binders is disclosed in U.S. Pat. No. 3,411,944 to Higashi. Higashi, in providing a tape with a high heat resistance, utilizes a triisocyanate crosslinked system which includes a silane polyol and exhibits rather low elongation and not much toughness. Toughness as defined in this disclosure as the area under the stress-strain cruve of a binder system, i.e. a material having a combination of considerable elongation and considerable tensile strength.

U.S. Pat. No. 3,384,679 to Stetz on the other hand, discloses a concept with respect to making polyurethane polymers which comprises the step of using a polyester polymeric reactant(instead of the dibasic acid described by Graubert) and allows him to attain a relatively tough elastomeric material. It is believed that it is from among materials such as those disclosed by Stetz that the polyurethanes most useful for forming magnetic tapes are selected.

SUMMARY OF THE INVENTION

Therefore, it is a principle object of the invention to provide an improved magnetic tape which is more durable in use.

Another object of the invention is to provide a magnetic tape having extraordinary durability when subjected to high-speed operation on digital tape transport apparatus or when subjected to video helical and quadraplex scan recorders with the video heads running at high speed against the stationary tape.

Another object of the invention is to provide a tape comprising a polyurethane-based binder for the magnetic particles, and, characterized by an excellent toughness as manifested in practical use and as definable in classical physical properties.

A further object of the invention is to provide a magnetic coating having excellent adhesion to a poly(ethylene terephthalate) backing sheet based on polyurethane resin, and exhibiting outstanding durability.

Other objects of the invention will be obvious to those skilled in the art on reading the instant application.

The above objects have been achieved by construction of magnetic tapes comprising, as a major constituent of the binder for electromagnetic particles, thermoplastic polyurethane resins characterized by little or no hydroxyl-or isocyanate-group activity.

Useful thermoplastic polyurethane resins include both polyester-type and polyether-type polyurethanes. When used alone, they are advantageously crosslinked sparingly, thereby enhancing the physical properties thereof. However, the polyurethane may also be combined with lesser quantities of supplemental resins and used in a substantially non-crosslinked form. In those tapes requiring the best abrasion resistance, some crosslinking is advantageous.

The polyurethane polymers which can be utilized in the instant invention are substantially linear, have very little or no isocyanate or hydroxyl-group reactivity but are cross-linkable probably through the urethane group.

In general, the materials have molecular weight from about 10,000 to 30,000 with the ester-derived unit advantageously having a molecular weight of 800 to 1200.

Particularly desirable, commercially-available, polyurethane resins are those generally linear polyurethane resins sold under the trade designations Estane 5707Fl and ESTANE 5714Fl by B. F. Goodrich Co. and that sold under the trade designation VITHANE TPU-123 by Goodyear Tire Rubber Co. The 5714Fl material is an ether-type polyurethane. The other two materials are ester-type polyurethanes.

The viscosity of these resins at a 15% polymer level is tetrahydrofuran ranges from 400 to 1500 cps. They have a minimum tensile strength of about 6000 psi, a minimum elongation of about 400%, and a minimum 300% modulus of about 1200.

The most favorable and versatile of such materials have relatively high molecular weights and a tensile strength above 10,000 psi, an elongation in excess of 400% and a 300% modulus in excess of 3500 psi. The aforesaid 5707 material is one such polyurethane resin.

Among supplemental binder resins which may be used in quantities up to nearly 50% by weight of the total resin binder, are linear thermoplastic polyester resins and combinations of such polyester resins with phenoxy resins. Polyglyol polymers, most advantageously those having a molecular weight of above 1800, are especially useful in supplementing ether-types polyurethanes.

Among the linear thermoplastic resins which are useful are the polymer sold under the trade designation GP85-1030E by U.S. M. Corp. This substantially saturated resin softens at about 243° to 252° F, is relatively hard (D70, Shore hardness). It is tough as evident from its tensile strength of 3950 and an elongation of 550%, and has a glass transition temperature of 26° C. Another saturated linear thermoplastic polyester is that sold under the trade designation PE-207 by Goodyear Tire and Rubber Company. This latter material has a glass transition temperature of 6° C and a ball-and-ring softening point of about 261° F. It has an elongation of 200%. In general the thermoplastic polyester should have a substantial elongation and a brittle temperature below about 30° C. These resins should also have a hydroxyl number of from 2 to 12 milligrams/KOH/gm. The elongation of these thermoplastic polyesters is advantageously at least about 150%.

Among the phenoxy resins, which may be used is that sold by Union Carbide Corp. under the trade designation PKHH. Such resins are found by reacting bisphenol with epichlorohydrin and have a basic chemical structure similar to epoxy resins but are tougher than conventional epoxies because of relatively high, e.g. 30,000, molecular weight, and a lack of highly reactive epoxy groups. The prior art has recognized the advantageous use of such resin, but has not incorporated them into magnetic tapes of the type claimed herein.

The general structure of such a phenoxy molecule is typified as

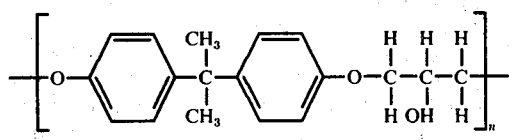

where $n$ is generally required from about 80 to 120.

Supplemental resins, useful for blending with ether-type polyurethane resins include such polyalkylene glycols as polytetramethylene glycols sold under the trade designation Polymeg 2000 and Polymeg 3000 by Quaker Oats Corp.; polypropylene glycols such as those sold under the trade designation P 2010 by Wyandotte Chemical Corp. In general these polyalkylene glycols should have molecular weights of 1500 or more, and hydroxyl numbers below 100. When incorporated into the polyurethane-based composition, they are to be crosslinked by use of such agents known to the chemical arts as the reaction products of trimethylolpropane and toluene diisocyanate.

If optimum abrasion resistance is to be achieved, with any given combination of resin ingredients, it is desirable to use crosslinking agents such as polyisocyanate compounds. A particular feature of the invention is that the polyurethane polymer constituents comprise so few crosslinkable sites that the resulting crosslinking is insufficient to embrittle the magnetic coating. On the contrary, the coatings remain tough, i.e. have a tensile strength of over 1100 psi, an elongation of 10% or more, and a toughness factor of over about 100 inch-pounds /in$^3$, as tested in a system wherein a acicular iron oxide having 0.5 to 1 micron length and an oil absorption of 40 ml/100 grams is utilized at a 70 wt% loading and (b) 3.5% by weight of a relatively conductive carbon black sold by Cabot Corporation under the trade designation Vulcan XC-72R. This carbon black has a nitrogen surface area of about 230 square meters per gram (BET method), a di-butylphthalate absorption of about 185 cc per 100 grams, is highly-structured, and has an elemental particle size of about 30 millimicrons.

Crosslinking also enhances the temperature stability of the coating. Consequently, it is desirable that video recording tapes, tapes intended for use on high-speed computer transports, and the like have crosslinked magnetic coatings thereon.

Crosslinking of the polymer component of the binder is carried out by use of such crosslinking agents as the polymeric isocyanate products commonly known to the art and sold under such trade designations as Mondur CB-75 (by Mobay Chemical Co.) and as Spenkel P49-75S and Spenkel P49-60XC (by Spencer-Kellogg Division of Textron) and as RC-829 (by DuPont). These materials are are polyurethane-type prepolymers with terminal isocyanate functionalities. These materials readily react to crosslink hydroxyl-bearing polymers. They contain about 12% –22% by weight of terminal NCO groups based on the weight of polymeric crosslinking agent. They should be low in residual diisocyanate, preferably containing less than 2% of such material.

This crosslinking reaction of the isocyanate and active hydrogen on the polyurethane and hydroxyl groups of polyesters and polyol materials, is catalyzed by such known catalysts as ferric acetyl acetonate, stannous octoate, and the like.

In making the magnetic coating of the invention, the resins are dissolved in a suitable solvent, e.g. those having a moderate hydrogen bonding capacity such as methyl ethyl ketone, tetrahydrofuran, dimethylformamide and the like. A dispersion aid, e.g. soya lacethin, is added to the solution to make it more efficient dispersing medium for the magnetic particles. The resulting slurry is milled or otherwise treated to disperse the magnetic pigment therein.

A number of adjuvants are normally added to the mixture to achieve one or more special effects. Among these are lubricants, such as silicone oils, stearate esters, waxes, or the like; fungicides and antioxidants.

The magnetic particles most commonly used are acicular gamma $Fe_2O_3$ of 0.2 to 1.5 microns in length and with a typical length-to-width ratio of approximately 7 to 1. The materials have coercive forces (hc) of at least about 250 oersteds and oil absorptive values of less than 50 milliliters per 100 grams.

A particular advantage of the invention is the fact that it can be used more advantageously with very much smaller particles having very much higher oil absorption values than can prior art binder systems.

It has been discovered that, to take the primary advantage of the physical properties of the polyurethane crosslinked system, one must select the magnetic powder component carefully. In general, for best mechanical performance, the oxide should be one with an absorption of less than 50 milliliters of boiled linseed oil (according to ASTM Test Method D-281-31) per 100 grams of iron oxide powder. Particles having a nominal particle range of 0.2 to 0.5 micron in length, e.g. the acicular powders sold under the trade designation K560 by Hercules and MO2530 by Pfizer and having oil absorption values of 38 and 36 are useful.

After the electromagnetic coating composition is prepared it is cast upon a backing sheet — normally a biaxially-oriented poly (ethylene terephthalate) resin of the type sold under the trade designation Mylar by E.I. DuPont de Nemours and Co. Inc., but sometimes cellulose acetate, polypropylene or the like. After being cast, it is dried, calendered, cured, slit, all in the manner presently known in the tape manufacturing art.

Moreover, there is nothing in the art to suggest that the vary great improvements in performance characteristics of magnetic tapes, like computer tapes and video tapes, would be achievable by using magnetic coatings having the mechanical properties possessed by the coatings of the instant invention. The precise mechanism which result in the improvement, (presumed to be some combination of thermal, mechanical and rheological properties) is not entirely understood.

ILLUSTRATIVE EMBODIMENTS OF THE INVENTION

In order to point out more fully the nature of the present invention, the following working examples are given as illustrative embodiments of the present process and products produced thereby.

Table A sets forth the formulations for a large number of magnetic coating compositions formed according to the invention.

all of the electromagnetic coating formulations in Table A contain a carbon black sold under the trade designation Vulcan XC72R by Cabot Corporation. A polyisocyanate type crosslinking agent such as sold under the trade designation Mondur CB-75 by Mobay Chemical Company; and soya lecithin wetting agent. These coatings also contain a small quantity of miscellaneous adjuvants such as antioxidants, fungicides and lubricants, these adjuvants are not specifically enumerated because they contribute no significant mechanical properties to the material and form no part of the novel subject matter defined by the claim appended hereto.

An iron oxide sold under the trade designation HR280 by Hercules Corp. and having a 1 micron length and an oil absorption of 29 ml. per 100 grams of oxide was used in each of the examples.

The first five specific working examples illustrate the use of an ester-type urethane.

All formulations except that of Example 2 contain a linear thermoplastic polyester as the sole supplemental resin. Example 2 contains only an ester-type polyurethane. Example 1 discloses a composition which contains no substantial crosslinking or catalyst components, but derives its properties from an interaction of the polyurethane and the supplemental thermoplastic resin.

Example 6 through 8 illustrate the use of urethane-polyester-phenoxy systems. It should be noted that Example 6 comprises no crosslinking agent and no catalyst. Investigations of gel content and other characteristics of the coating formed from the composition of Example 6 indicate that it contains very little or no crosslinking.

Examples 9 through 11 illustrate polyurethane-based systems utilizing an ether-based polyurethane. Examples 10 and 11 utilize a crosslinked polymethylaneglycol a supplemental resin.

TABLE A

| Formulation No. | 1 | 2 | 3 | 4 | 5 | 6 | 7 | 8 | 9 | 10 | 11 |
|---|---|---|---|---|---|---|---|---|---|---|---|
| Polyurethane Estane 5707 | 19.2 | 22.8 | 18.24 | X | 17.28 | 15.75 | 15.75 | 15.75 | X | X | X |
| Estane 5714 FL | X | X | X | X | X | X | X | X | 25 | 20.5 | 20.5 |
| TPU-123 | X | X | X | 18.24 | X | X | X | X | X | X | X |
| Polyester GP85-1030E | X | X | 4.56 | X | 4.32 | 2.25 | 2.25 | 2.25 | X | X | X |
| Vitel PE-207 | 3.8 | X | X | 4.56 | X | X | X | X | X | X | X |
| Phenoxy Resin | X | X | X | X | X | 4.5 | 4.5 | 4.5 | X | X | X |
| Polyethylene Glycol 3000 m.w. | X | X | X | X | X | X | X | X | X | 5.23 | X |
| 2000 m.w. | X | X | X | X | X | X | X | X | X | X | 5.23 |
| Catalyst Ferric Acetyl Acetonate | X | 0.024 | 0.024 | 0.024 | 0.024 | X | X | X | X | X | X |
| Stannous Octvate | X | X | X | X | X | X | 0.02 | 0.02 | 0.03 | 0.014 | 0.014 |
| Crosslinking Agent | X | 1.2 | 1.2 | 1.2 | 2.4 | X | 1.12 | 2.24 | 1.5 | 1.28 | 1.40 |
| Magnetic Pigment | 70 | 70 | 70 | 70 | 70 | 72 | 72 | 72 | 71 | 68 | 68 |
| Carbon Black | 3.5 | 3.5 | 3.5 | 3.5 | 3.5 | 3.5 | 3.5 | 3.5 | 3.5 | 3.5 | 3.5 |
| Wetting Agent | 2.0 | 2.0 | 2.0 | 2.0 | 2.0 | 1.5 | 1.5 | 1.5 | 1.5 | 2.0 | 2.0 |
| Tetrahydrofuran | 185 | 185 | 185 | 185 | 185 | 185 | 185 | 185 | 185 | 185 | 185 |
| Misc. Adjuvants | 0.5 | 0.5 | 0.5 | 0.5 | 0.5 | 0.5 | 0.5 | 0.5 | 0.5 | 0.5 | 0.5 |

TABLE B

| MECHANICAL PROPERTIES | 1 | 2 | 3 | 4 | 5 | 6 | 7 | 8 | 9 | 10 | 11 |
|---|---|---|---|---|---|---|---|---|---|---|---|
| Tensile Strength, psi | 1500 | 1900 | 1400 | 1200 | 1500 | 1100 | 1500 | 1800 | 1200 | 1400 | 1500 |
| Elongation, % | 20 | 16 | 12 | 14 | 14 | 25 | 20 | 17 | 23 | 28 | 20 |
| Toughness, in-lbs/in$^3$ | 280 | 290 | 155 | 160 | 195 | 250 | 280 | 290 | 260 | 350 | 270 |
| Abrasion Resistance mg-loss | 6.7 | 7.9 | 7.1 | 8.0 | 6.9 | 8.4 | 4.7 | 4.3 | 10.5 | 7.2 | 8.6 |
| TAPE PERFORMANCE | | | | | | | | | | | |
| Computer Tape Shuttle Test | ← ALL MATERIALS EXCEEDED 30,000 PASSES → | | | | | | | | | | |
| Video Durability Test | ← NO SIGNAL DEGRADATION AFTER 1 HOUR MINIMUM → | | | | | | | | | | |
| Rub Off Test | ← ALL MATERIALS FREE OF RUB-OFF AFTER AGING 7 DAYS → | | | | | | | | | | |
| Layer-to-Layer Adhesion | ← ALL MATERIALS ADHESION FREE AFTER 7 DAYS → | | | | | | | | | | |
| Adhesion Test | ← ALL MATERIALS PASS → | | | | | | | | | | |
| Hardness, kg per mm$^2$ | ← ALL SAMPLES BETWEEN 10–20 → | | | | | | | | | | |

The above shuttle and video performance tests were run with and without lubricants added to the magnetic coating with no substantial difference in result.

The compounding of compositions listed in Table A is carried out according to manipulative procedures well known in the polymer-and-resin-compounding arts. Composition No. 1 was prepared by milling the magnetic pigment with a tetrahydrofuran solution of the resin components, additives and wetting agent for 18 hours in a ball mill. Then the carbon black was added and milling was resumed for another six-hour period. The reslting composition was coated on a polyethylene terephthalate film and dried for 15 seconds at 80° to remove the solvent. Coating samples for measuring tensile etc. were prepared by drying for 5 minutes at 100° C.

Compositions 2 through 5 were prepared as was Composition 1, excepting that the crosslinking agents and catalyst were added to the resulting dispersion before it was coated onto the supporting film. Then after these coating were dried for 15 second and calendered, they were cured for 1 hour at 80° to 100° C. Samples for measuring tensile etc. were also post-cured for 1 hour at 80° to 100° C.

The resultant sparingly crosslinked coatings were very resistant to solvent attack.

Compositions 6, 7 and 8 were prepared by adding both the carbon black and magnetic pigment to a solution of resins, wetting agent and adjuvants; agitating for 2 hours, on a paint can shaking machine, in a steel container containing steel ball bearings. Composition 6 was then coated on to a backing sheet and handled in the same manner composition 1 had been handled; Compositions 7 and 8 were mixed with crosslinking agent etc. in the same manner as Composition 2 through 5.

The compounding steps were carried out in a substantially anhydrous nitrogen atmosphere to assure that atmospheric moisture is excluded from the reaction vessels.

The physical properties of the electromagnetic coating system are determined by testing a strip of the finished coating. The strip is from 0.002 to 0.003 inch in thickness. Such a strip is prepared by casting the coating formulation onto a plate covered with poly(tetrafluoroethylene), drying and curing.

The tape performance tests are carried out on polyethylene terephthalate-backed coatings of 0.0004 inch in thickness.

Tensile testing is carried out, according to ASTM-D882-67, on a tensile tester of the type generally known in the trade and sold by Instron. The samples were 1 inch wide and 2-inches in gage length; the strain rate was 0.5 inch per minute, i.e. 25% of the sample length. By such testing, the tensile strength, elongation and toughness of the electromagnetic coating has been established.

The area under the stress-strain curve was taken as a measure of toughness. This has been referred to as the modulus of "modulus of toughness" in "Materials Science in Engineering" by Carl A. Keyser (C. E. Merril Publishing Co., Columbus, Ohio 1968, p. 21–22.

Abrasion resistance of the electromagnetic coating system is tested by use of a testing device of the type known to the art as a Tabor Abrasor and according to Federal Test Method Standard No. 141a, Method 6192. A CS-10F wheel in use with a 250-gram load for 1000 cycles. The coating tested is from 0.001 to 0.002 inch in thickness and is cast on a poly(ethylene terephthalate) base.

A number of other empirical tests have been found useful to characterize the performance of magnetic tapes prepared in accordance with the instance invention. These tests include the following:

Standard Computer Tape Shuttle Test

A 2 foot section of the magnetic tape to be tested is selected by screening it by standard digital certification techniques. If it is found to be defect-free, that is to show no data errors when recorded at 800 flux changes per inch (NRZ), it has passed the screening test and qualifies for the Shuttle Test. In this regard, an "error" is a signal loss, in any bit, which exceeds 40%.

The qualified section of tape is again recorded at 800 flux changes per inch and then is repeatedly read back while being shuttled on a tape certifier. A Control Data Corp. Model 686 certifier is entirely suitable for this procedure. The testing is terminated, and the tape is said to have failed, when the first error is detected. These errors most often occur when debris from the magnetic coating accumulates on the reading head and causes a momentary separation of the head from an operable tape-reading position.

Presently marketed magnetic tapes fail below 20,000 passes. The tapes of the present invention reliably exceed 30,000 passes before a failure.

Video Durability Test

A ½-inch or one-inch wide tape is recorded with a video test signal. The signal is then played back on a video recorder/producer device. The device is selected to be either a Sony Model Av 5000 A (for ½-inch tapes) or an Ampex Model VPR 5200 (for one-inch tapes). The recorder is put into the still frame mode wherein the magnetic tape is stationary and the recording head (s) pass across the tape at high speed. (The Sone machine operates at 600 inches per second; the Ampex machine operates at 1000 inches per second).

A television monitor is used to view the picture and failure is defined as having occurred at this point in viewing time when a visually-perceivable increase in dropout activity or visually objectionable picture degradation occurs.

Another means to define failure is to measure the Radio Frequency output of the recorder by electronic means. This may be accomplished by use of an AC vacuum tube voltmeter or by rectifying the RF output and recording on a strip chart recorder while playing back a prerecorded signal, typically the standard NTSC/ElA color bars). Failure measured by this latter technique is defined as a reduction of more than 50% in RF signal output, i.e. a reduction of 6 decibels.

Rub-Off Test

A 200 foot length of tape is passed over wiping cloths or a sharp blade of the type commonly used on digital computer transports at a speed of 150 inches per second. The wiping cloth (usually on the Mylar-backing surface) or blade (usually on the magnetic coating surface) is visually examined for any particles or other debris caused by either mechanical or chemical deterioration of the magnetic coating The tape is aged for 72 hours at 50° C and 50% relative humidity; then it is retested.

The tape is aged again under the same conditions and retested again.

Results are reported in terms of aging time before any debris is wiped off of the type.

Layer-to-Layer Adhesion Test

This test is designed to determine whether or not the tape will be resistant to blocking when packaged and stored in rolls, especially such severe layer-to-layer adhesion that the magnetic coating is damaged.

The tape is first cooled to room temperature, then aged for 72 hours at 50° C/50% relative humidity. After the tape is cooled to 25° C, unwound and examined for any layer-to-layer adhesion. The adhesion problem usually manifests itself by a sticking between tape layers at the hub of the tape spool. Very often any sticking is such that the magnetic coating is pulled off the substrate and on to the back of the substrate of the adjacent layer of tape. The minimum tape roll diameter is 4 inches and the tape is rolled with the common commercial-packaging technique.

Adhesion Test

The adhesion of the magnetic coating (0.0003 to 0.0005 inch thick) to the backing sheet is measured by firmly pressing the common, cellophane-backed adhesive tape (commonly known as "scotch tape") on to the electromagntic coating. The tape is then quickly jerked off of the coating by hand. The tape passes the test if no magnetic coating sticks to the adhesive layer of the testing tape.

Hardness

Hardness is tested on a Wilson Model MO Tukon Tester using a 2-gram weight. All the coatings subject of this invention have a knoop-microhardness of from about 10 to 20 kilograms per square millimeter.

It has also been discovered that use of binder systems prepared according to the invention are particularly important in that they provide a binder which can be successfully utilized with very small acicular magnetic particles, i.e. magnetic particles having average particle length below about 0.1 micron and oil absorption values above 75 ml per 100 gram and still be used to form a very high performance tape. In these cases, the particle size results in somewhat lower physical properties, a sacrifice sometimes made willingly in order to be able to use certain classes of magnetic particles having exceptional magnetic properties.

The abrasion resistance of the tapes of the invention is believed to be from 3 to 6 times as great as the tapes now known in the art.

It is of course to be understood that the foregoing example(s) is(are) intended to be illustrative and that numerous changes can be made in the reactants, proportions, and conditions set forth therein without departing from the spirit of the invention as defined in the appended claims.

What is claimed is:

1. In a magnetic recording tape of the type comprising a backing film and a magnetic coating thereon wherein said coating is formed of iron oxide magnetic particles within a resinous matrix therefor, the improvement wherein
    a. the matrix resin comprises at least about 50% by weight of a poly-urethane elastomer resin characterized by a minimum elongation of about 400%, a minimum tensile strength of 6000 psi, and a minimum 300% modulus of about 1200 psi, and comprises from about 0 to 50% by weight of a supplemental resin; and
    b. wherein said magnetic coating comprises said iron oxide particles having an oil absorption value of less than 50 ml per 100 grams;
    wherein said magnetic coating has properties including a minimum tensile strength of about 1100 psi; a minimum elongation of about 10%; and a minimum toughness of about 100 inch-pounds per cubic inch; all said properties of said coating being measured when said coatings consists essentially of, in addition to the matrix resin, (a) at least 70% by weight of an acicular gamma $Fe_2O_3$ particle of a 0.5 micron length and an oil absorption of at least 25 ml per 100 grams (b) at least 3.5% by weight of carbon black having a surface area of about 230 square meters per gram and a di-butyl phthalate absorption of 185 cc per gram.

2. A magnetic tape as defined in claim 1 wherein said resinous matrix comprises polyurethane having a tensile strength of 10,000 psi, an elongation is excess of 400%, and 300% modulus in excess of 3500 psi.

3. A magnetic tape as defined in claim 1 wherein said resinous matrix is a thermoplastic consistisng essentially of said polyurethane, and a linear thermoplastic polyester which is characterized by a minimum elongation of 150%, and a thermoplastic phenoxy resin of the formula

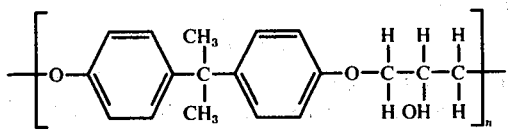

wherein n is from 80 to 120.

4. A magnetic tape as defined in claim 1 comprising, additionally, polymeric linkages derived from polymeric isocyanate crosslinking having up to 20% by weight of reactive, NCO groups therein, and incorporated into said resinous matrix in a quantity of from about 0.5 to 3% by weight.

5. A magnetic tape as defined in claim 2 comprising, additionally, polymeric linkages derived from polymeric isocyanate crosslinking having up to 20% by weight of reactive NCO groups therein, and incorporated into said binder in a quantity of from about 0.5 to 3% by weight.

6. A magnetic tape as defined in claim 3 comprising, additionally polymeric linkages derived from polymeric isocyanate crosslinking having up to 20% by weight of reactive NCO groups therein, and incorporated into said binder in a quantity of from about 0.5 to 3% by weight.

7. A magnetic tape as defined in claim 4 wherein said binder consists essentially of an ether-tape polyurethane and said supplemental resin comprises a major portion of a polyalkylene glycol resin having a molecular weight of at least 1800 and a hydroxyl number below 100.

8. A magnetic tape as defined in claim 1 and further characterized by a Video Durability Test Value of at least one hour and Shuttle Test Value of at least 30,000 passes.

9. A magnetic tape as defined in claim 2 and further characterized by a Video Durability Test Value of at least one hour and a Shuttle Test Value of at least 30,000 passes.

10. A magnetic tape as defined in claim 3 and further characterized by a Video Durabiity Test Value of at least one hour and a Shuttle Test Value of at least 30,000 passes.

11. A magnetic tape as defined in claim 6 and further characterized by a Video Durability Test Value of at least one hour and a Shuttle Test Value of at least 30,000 passes.

12. In a magnetic recording tape of the type comprising a backing film and a magnetic coating thereon wherein said coating is formed of magnetic particles within a resinous matrix therefor, the improvement wherein the matrix resin is substantially free of crosslinking, comprises less than about 7.5% by weight of wetting agents,
  a. comprises at least about 50% by weight of a polyurethane elastomer resin characterized by a minimum elongation of about 400%, a minimum tensile strength of 6000 psi, and a minimum 300% modulus of about 1200psi, and from about 0 to 50% by weight of a supplemental resin; and
  b. wherein said magnetic coating comprises iron oxide having an oil absorption value of less than 50 ml per 100 grams; and
  c. wherein said magnetic coating has properties including a minimum tensile strength of about 1100 psi; a minimum elongation of about 10%; and a minimum toughness of about 100 inch-pounds per cubic inch; all said properties of said coating being measured when said coating consists essentially of, in addition to the matrix, (1) at least 70% by weight of an acicular gamma $Fe_2O_3$ particle of a 0.5 micron length and an oil absorption of at least 25 ml per 100 grams and (2) at least 3.5% by weight of carbon black having a surface area of about 230 square meters per gram and a di-butyl phthalate absorption.

13. A magnetic tape as defined in claim 12 wherein said resinous matrix comprises polyurethane having a tensile strength of 10,000 psi, an elongation in excess of 400% and a 300% modulus in excess of 3500 psi.

14. A magnetic tape as defined in claim 13 wherein said binder is a thermoplastic consisting essentially of said polyurethane, and a linear thermoplastic polyester which is characterized by a minimum elongation of 150%, and a thermoplstic phenocy resin of the formula

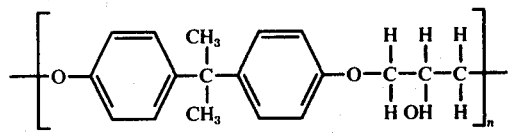

wherein n is from 80 to 120.

15. A magnetic tape as define in claim 14 comprising additionally, polymeric linkages derived from polymeric isocyanate crosslinking having up to 20% by weight of reactive NCO groups therein, and incorporated into said binder in a quantity of from about 0.5 to 3% by weight.

16. A magnetic tape as defined in claim 13 and further characterized by a Video Durability Test Value of at least one hour and a Shuttle Test Value of at least 30,000 passes.

17. A magnetic tape as defined in claim 14 and further characterized by a Video Durability Test Value of at least one hour and a Shuttle Test Value of at least 30,000 passes.

18. In a magnetic recording tape of the type comprising a backing film and a magnetic coating thereon wherein said coating is formed of magnetic iron oxide particles within a resinous matrix therefor, the improvement wherein
  the matrix resin is a thermoplastic and comprises at least about 50% by weight of a polyurethane elastomer resin, free of crosslinking agent, and characterized by a 300% modulus of at least about 1500, a minimum elongation of about 400%, a minimum tensile strength of 6000 psi, and from about 0 to 50% by weight of a supplemental resin; and
  wherein said magnetic coating has properties including a minimum tensile strength of about 1100 psi; a minimum elongation of about 10%; and a minimum toughness of about 100 inch-pounds per cubic inch; all said properties of said coating being measured when said coating consists essentially of, in addition to the matrix, (a) at least 70% by weight of an acicular gamma $Fe_2O_3$ particles of a 0.5 micron length and an oil absorption of at least 25 ml per 100 grams and (b) at least 3.5% by weight of carbon black having a surface area of about 230 square meters per gram and di-butyl phthalate absorption of 185 cc per gram.

19. A recording tape as defined in claim 18 wherein said magnetic particles have an oil abosrption value of over 75 ml per 100 grams of particle.

* * * * *

UNITED STATES PATENT OFFICE
CERTIFICATE OF CORRECTION

Patent No. 4,020,227    Dated April 26, 1976

Inventor(s) Robert J. Deffeyes    Page 1 of 2

It is certified that error appears in the above-identified patent and that said Letters Patent are hereby corrected as shown below:

Col. 4, line 47:     change "XC" to --CX--;

Col. 4, line 49:     delete "are" (first instance);

Col. 5, line 10:     change "(hc)" to --(Hc)--;

Col. 6, line 11:     change "all" to --All--;

Col. 7, line 29:     change "reslting" to --resulting--;

Col. 7, line 38:     change "second" to --seconds--;

Col. 8, line 32:     delete "modulus of" (first instance);

Col. 8, line 34:     before period (.) insert -- )--;

Col. 9, line 24:     remove ")";

Col. 9, line 43:     change "type" to --tape--;

Col. 9, line 67:     change "electromagntic" to

--electromagnetic

UNITED STATES PATENT OFFICE
CERTIFICATE OF CORRECTION

Patent No. 4,020,227          Dated April 26, 1976

Inventor(s) Robert J. Deffeyes          Page 2 of 2

It is certified that error appears in the above-identified patent and that said Letters Patent are hereby corrected as shown below:

Claim 2, line 61:   change "is" to --in--;

Claim 14, line 18:  change "thermoplstic" to --thermoplastic--

Facing Page, Item 45 ([45]): change "Apr. 26, 1976" to

--Apr. 26, 1977--

Signed and Sealed this thirtieth Day of August 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,020,227
DATED : April 26, 1977
INVENTOR(S) : Robert J. Deffeyes

It is certified that error appears in the above-identified patent and that said Letters Patent are hereby corrected as shown below:

Column 10, line 58:  change "185" to --1.85--

Column 12, line 12:  after "absorption" add --of 1.85 cc per gram--

Column 12, line 65:  change "185" to --1.85--

Signed and Sealed this

Twenty-first Day of March 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,020,227
DATED : April 26, 1976
INVENTOR(S) : Robert J. Deffeyes

It is certified that error appears in the above-identified patent and that said Letters Patent are hereby corrected as shown below:

Column 10, line 58:  change "185" to --1.85--

Column 12, line 9:   after "absorption" add --of 1.85 cc per gram.--

Column 12, line 65:  change "185" to --1.85--

This Certificate supersedes Certificate of Correction issued March 21, 1978.

Signed and Sealed this

Ninth Day of January 1979

[SEAL]

Attest:

RUTH C. MASON
Attesting Officer

DONALD W. BANNER
Commissioner of Patents and Trademarks